United States Patent [19]
Shirai

[11] Patent Number: 6,070,479
[45] Date of Patent: Jun. 6, 2000

[54] ROLLING ELEMENT STRING AND LINEAR GUIDE DEVICE AND ROLLING ELEMENT SCREW DEVICE USING THE SAME

[75] Inventor: Takeki Shirai, Tokyo, Japan

[73] Assignee: THK Co., Ltd., Tokyo, Japan

[21] Appl. No.: 09/093,820

[22] Filed: Jun. 9, 1998

[30] Foreign Application Priority Data

Jul. 1, 1997 [JP] Japan ................................. 9-175730

[51] Int. Cl.⁷ ............................. F16H 25/22; F16C 33/38
[52] U.S. Cl. .................................. 74/89.15; 74/424.8 R; 74/459; 384/51
[58] Field of Search .......................... 74/89.15, 424.8 R, 74/459; 384/43, 44, 45, 51

[56] References Cited

U.S. PATENT DOCUMENTS

| | | | |
|---|---|---|---|
| 1,885,970 | 11/1932 | Westling ........................... | 74/459 X |
| 4,572,678 | 2/1986 | Neder et al. ....................... | 384/533 |
| 5,156,462 | 10/1992 | Jacob et al. ....................... | 384/49 |
| 5,553,946 | 9/1996 | Agari ................................ | 384/49 |
| 5,755,516 | 5/1998 | Teramachi et al. .................. | 384/45 |

FOREIGN PATENT DOCUMENTS

| | | |
|---|---|---|
| 2212189 | 9/1973 | Germany . |
| 3635261A1 | 7/1987 | Germany . |
| 5-52215 | 3/1993 | Japan . |
| 5-52217 | 3/1993 | Japan . |
| 5-27408 | 4/1993 | Japan . |
| 10-89360 | 4/1998 | Japan . |

*Primary Examiner*—Allan D. Herrmann
*Attorney, Agent, or Firm*—Arent Fox Kintner Plotkin & Kahn, PLLC

[57] ABSTRACT

The invention provides a rolling element string which can be bent or twisted freely in any direction in use while holding rolling elements such as balls or rollers surely and which can be used in existing linear guide devices and ball screw devices without any special processing having to be carried out on the rolling element rollways thereof along which the rolling elements are to roll, and a linear guide device and a rolling element screw device having this rolling element string fitted in an endless raceway. The rolling element string comprises multiple rolling elements for rolling along a rolling element rollway of a bearing device and a flexible link belt by which these rolling elements are arranged in a line with a predetermined spacing and each rollably held, the link belt comprising: multiple links connected in a line and each formed substantially like a ring and having a receiving hole for a rolling element; and holding parts provided projecting from upper and lower sides of each of the links at front and rear ends thereof in the rolling element alignment direction for, for each link, preventing the rolling element from falling out of the receiving hole.

7 Claims, 15 Drawing Sheets

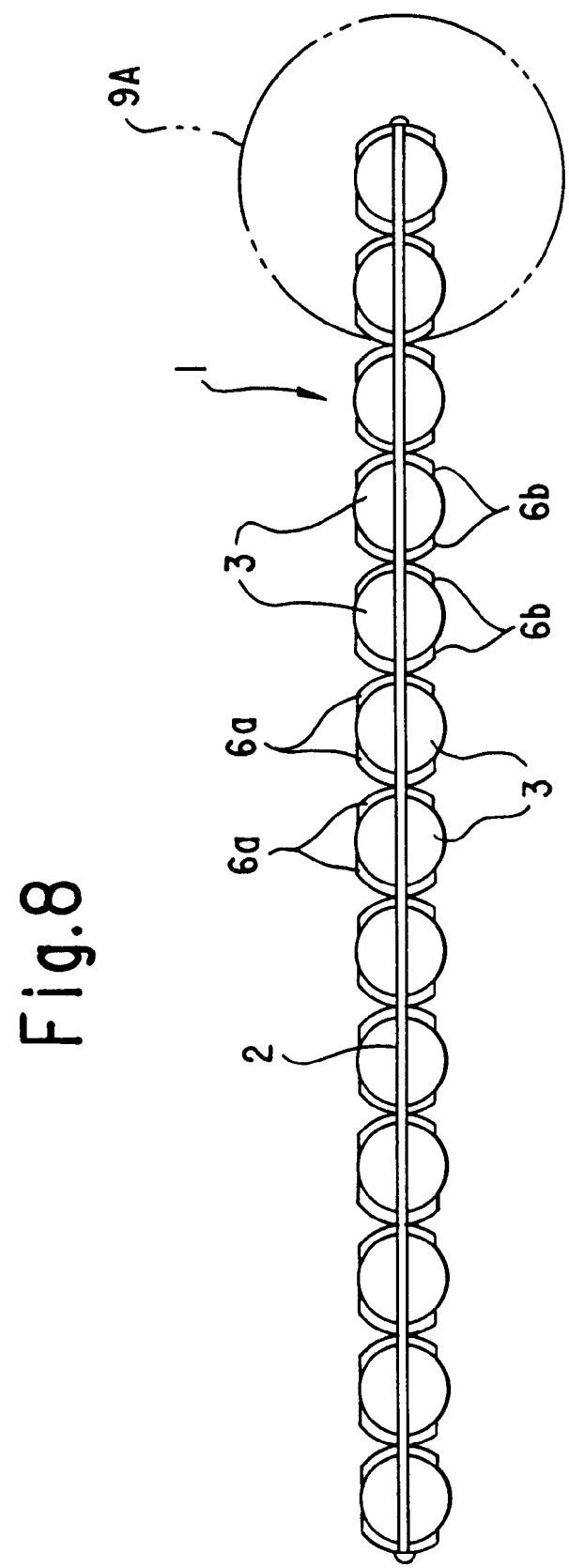

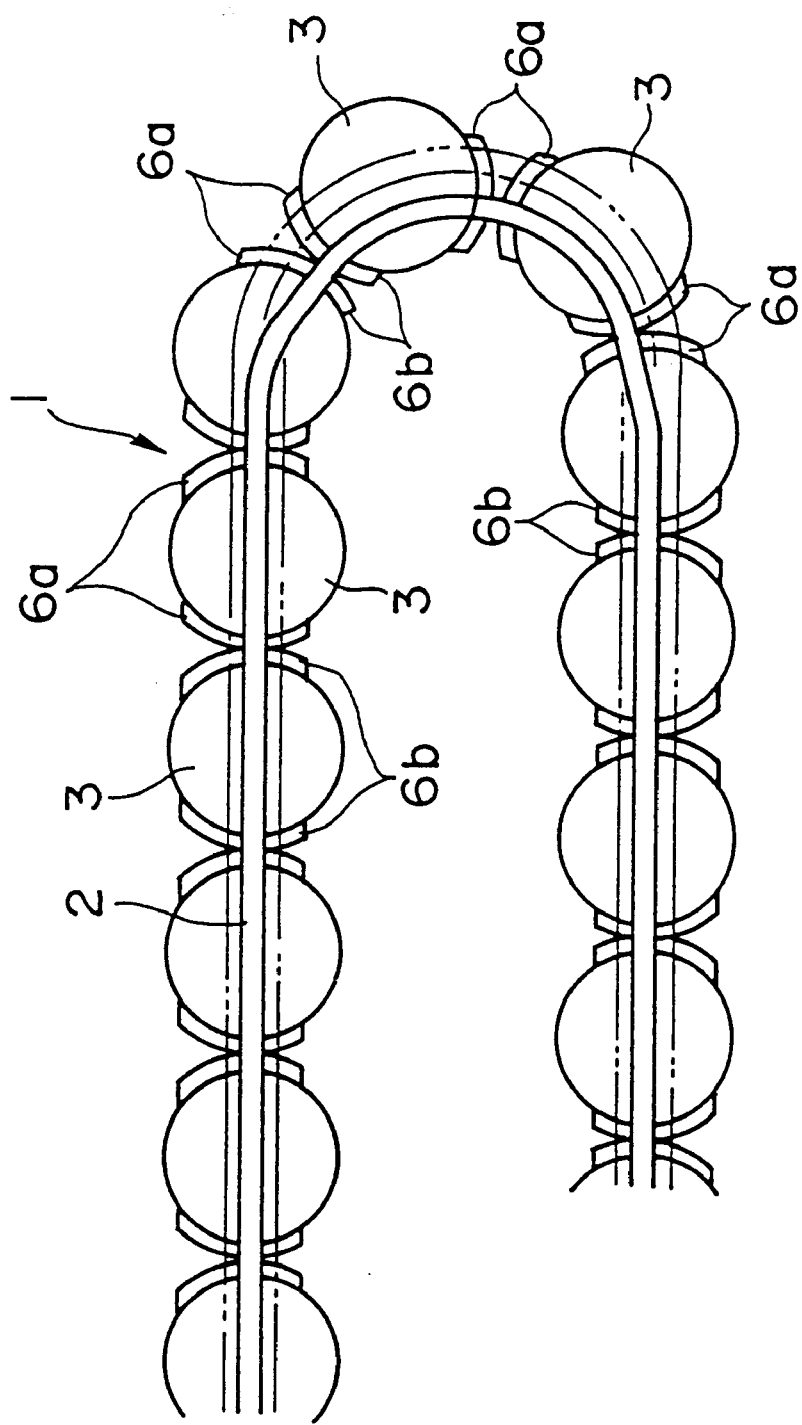

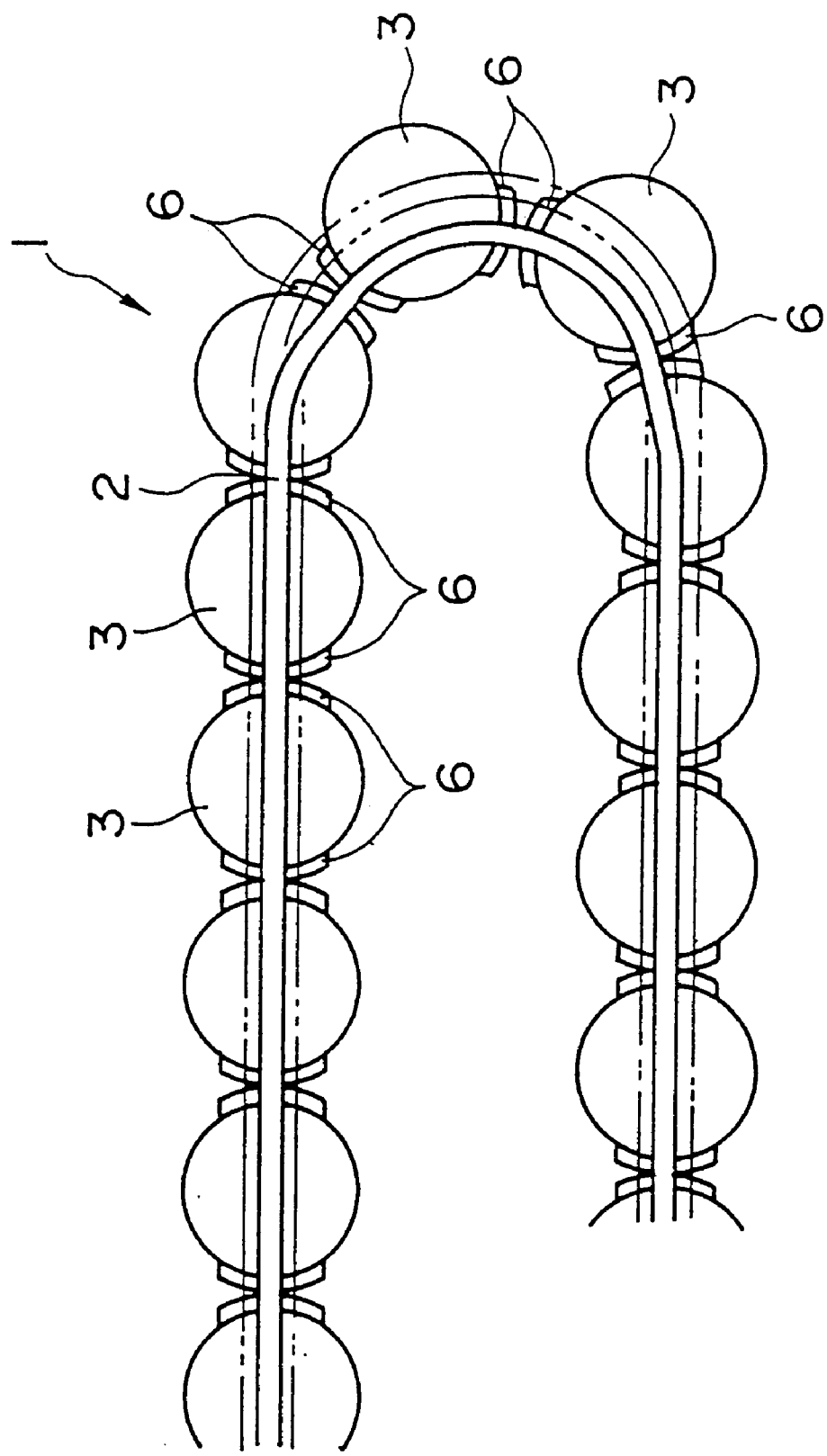

ROLLING ELEMENT STRING AND LINEAR GUIDE DEVICE AND ROLLING ELEMENT SCREW DEVICE USING THE SAME

BACKGROUND OF THE INVENTION

This invention relates to a rolling element string in which multiple rolling elements such as balls or rollers are arranged in a line and held rollably and which is used fitted for example in an endless raceway of a linear guide device or a ball screw device for unlimited sliding, and particularly to a rolling element string which can be freely bent or twisted in use and a linear guide device and a rolling element screw device using this rolling element string.

Known linear guide devices for guiding a movable body such as a table along a fixed body such as a bed include those made up of a track rail having a ball rolling groove, a slider which moves along the track rail and has a loaded-rolling groove facing this ball rolling groove and has a no-load rollway through which balls are circulated from one end of the loaded-rolling groove to the other, and multiple balls which roll between the slider and the track rail while supporting a load and circulate around an endless raceway formed by the loaded-rolling groove and the no-load rollway of the slider.

In a linear guide device of the related art constructed in this way, because the endless raceway of the slider is filled by the balls, when the slider moves along the track rail, mutually adjacent balls collide with and rub against each other as they circulate around the endless raceway, and consequently there has been the problem that the balls wear quickly and the life of the device is short.

As a device which solves this problem, a linear guide device wherein a ball string made up of multiple balls held in a line is fitted in the kind of endless raceway described above has been proposed (Japanese Unexamined Patent Publication No. H. 5-52217). As shown in FIG. 13 and FIG. 14, this ball string 100 is made by interposing spacers 102 between mutually adjacent balls 101 and connecting the spacers 102 together with a pair of belt members 103 extending in the direction in which the balls are aligned, and is manufactured by injection molding of a flexible resin with the balls 101 disposed inside the mold as cores.

A ball string 100 of the related art constructed in this way is fitted in an endless raceway 105 of a slider 104 as shown in FIG. 15 and circulates around the inside of the endless raceway, and as it does so, because the spacers 102 are interposed between adjacent balls 101, the balls are prevented from rubbing and colliding with each other and wear of the balls 101 is minimized.

However, in this related art ball string 100, because each of the spacers 102 is supported by the two balls 101, 101 positioned on either side of it, when due to bending or twisting of the ball string 100 the angle of abutment of the spacers 102 with the balls 101 changes greatly, there is a possibility of the balls 101 dropping out from between the spacers 102.

Thus, although the related art ball string does perform the function of a retainer for preventing balls from making contact with each other, it does not fully perform the function of a so-called ball holder for preventing balls from dropping out, and for this reason, in related art linear guide devices in which this kind of ball string is fitted, to completely prevent incidents of balls dropping out when the slider is removed from the track rail, countermeasures such as separately fitting a ball holder have had to be employed.

In this connection, as a ball string having a strengthened ball-holding function, the present inventors have already proposed a new ball string 112 (FIG. 16 and FIG. 17) wherein four belt members 111 formed in the shape of bands extending in the direction of alignment of balls 110 are bound between each pair of adjacent balls and by this means the balls 110 are restrained from four directions and prevented from falling out (Japanese Patent Application No. H.8-245314).

However, with this new ball string 112, when it is bent, compressive forces act on the belt members 111 positioned on the inner side of the bend and tensile forces act on the belt members 111 positioned on the outer side of the bend and these belt members 111 obstruct the free bending of the ball string 112, and consequently there has been the new problem that the smooth circulation of the ball string 112 inside the endless raceway is hindered.

Also, because the faces of the balls are equally divided up by the four belt members 111, when these balls 110 roll along a ball rolling groove of a track rail and a loaded-rolling groove of a slider the belt members 111 are liable to interfere with the ball rolling groove and the loaded-rolling groove, and to avoid this interference it has been necessary to form escape grooves in the ball rolling groove and the loaded-rolling groove to receive the belt members 111. Consequently, in a linear guide device or the like using a ball string 112 of this kind, there has been the problem that it is necessary to especially form escape grooves for receiving the belt members 111 in the ball rolling groove of the track rail and the loaded-rolling groove of the slider and the manufacturing cost increases correspondingly.

SUMMARY OF THE INVENTION

It is therefore an object of the present invention to provide a rolling element string which can be bent or twisted freely in any direction in use while holding rolling elements such as balls or rollers securely, and which can be applied unchanged in existing linear guide devices and ball screw devices without any special processing having to be carried out on the rolling element rollways thereof along which the rolling elements are to roll.

It is another object of the invention to provide a linear guide device and a rolling element screw device having this rolling element string fitted in an endless raceway.

To achieve these and other objects, the present invention provides a rolling element string comprising multiple rolling elements for rolling along a rolling element rollway of a bearing device and a flexible link belt by which these rolling elements are arranged in a line with a predetermined spacing and each rollably held, the link belt comprising: multiple links connected in a line and each formed substantially like a ring and having a receiving hole for a rolling element; and holding parts provided projecting from upper and lower sides of each of the links at front and rear ends thereof in the rolling element alignment direction for, for each link, preventing the rolling element from falling out of the receiving hole.

According to this provision of the invention, the flexible link belt is constructed by connecting in a line ringlike links each having a receiving hole for a rolling element and providing pairs of holding parts projecting from the upper and lower sides of each of the links, and the rolling elements are confined to the receiving holes of the links by the holding parts. That is, in a rolling element string according to the invention, each link forms part of one rolling element holding unit, and multiple rolling element holding units are connected together to form a rolling element string wherein rolling elements are arranged in a line.

Because the link belt is constructed by connecting links in a line like this it can be freely bent or twisted in any direction between the links, and furthermore, even when it is so used, the rolling elements can be held surely by the above-mentioned rolling element holding units. Therefore, this rolling element string can be applied not only in an endless rolling element circulation passage of a conventional linear guide device for unlimited sliding wherein rolling elements are circulated in a flat plane, but also in an endless circulation passage of a rolling element screw device wherein rolling elements are circulated in a spiral.

Also, because the holding parts are provided projecting from the surfaces of the links in a line extending in the alignment direction of the rolling elements, if the projecting heights of these holding parts with respect to the links are set lower than the projecting heights of the rolling elements with respect to the links, whatever the cross-sectional shape of a rolling element rollway through which the multiple rolling elements arranged in a line in the link belt roll, the holding parts do not interfere with the rolling element rollway. Therefore, a rolling element string according to the invention can be applied to any rolling element rolling groove formed in for example the shape of a circular arc or a gothic arch.

Here, as the shape of the holding parts provided projecting from the links, from the point of view of effectively preventing the rolling elements from dropping out of the receiving holes of the links, it is desirable for the surfaces of the rolling elements to be covered as widely as possible. However, because the rolling elements are to roll along a rolling element rollway, at least in the regions where the rolling elements make contact with the rolling element rollway it is necessary for the surfaces of the rolling elements to be exposed and not covered by the holding parts.

Also, to surely prevent the rolling elements from dropping out from the links, it is desirable for the projecting height of the holding parts facing each other across the rolling elements to be set as large as possible, but if this projecting height is made too large there is a risk that when the rolling element string is greatly bent the tips of the holding parts situated on the inner side of the bend will interfere with each other and free bending of the rolling element string will be hindered.

When on the other hand the projecting heights of the holding parts are set small to ensure free bending of the rolling element string, there is a risk that when the rolling element string is greatly bent, due to the gaps between the holding parts situated on the outer side of the bend widening, the rolling elements will drop out of the rolling element string.

Therefore, considering these circumstances, it is preferable for the projecting height with respect to the links of the holding parts projecting from either the upper sides or the lower sides of the links to be made higher than the projecting height of the holding parts projecting from the other sides of the links to prevent the holding parts on the inner side of a bend in the rolling element string from interfering with each other and prevent widening of the gaps between the holding parts on the outer side of a bend.

A rolling element string according to the invention constructed in this way can for example be used in a linear guide device made up of a guide shaft having a rolling element rollway extending in its length direction and a slide member which moves along the guide shaft and has a load rollway facing this rolling element rollway and has a no-load rollway through which rolling elements are circulated from one end of the load rollway to the other, and in this case the rolling element string is fitted in an endless raceway formed by the load rollway and the no-load rollway of the slide member so that she rolling elements bear a load between the load rollway of the slide member and the rolling element rollway of the guide shaft.

A rolling element string according to the invention can also be used in a rolling element screw device made up of a screw shaft in an outer circumferential surface of which is formed a helical rolling element rollway and a nut member which screws along the screw shaft on rolling elements and has in an inner circumferential surface thereof a load rollway facing the rolling element rollway of the screw shaft and has a no-load rollway through which the rolling elements are circulated from one end of the load rollway to the other, and in this case the rolling element string is fitted in an endless raceway formed by the load rollway and the no-load rollway of the nut member so that the rolling elements bear a load between the load rollway of the nut member and the rolling element rollway of the screw shaft.

BRIEF DESCRIPTION OF THE DRAWINGS

FIG. 8 is a front view showing a ball string pertaining to a second preferred embodiment of the invention;

FIG. 10 is a partial enlarged view of a ball string of the second preferred embodiment fitted in an endless raceway of a linear guide device;

FIG. 11 is a partial enlarged view illustrating a problem arising when a ball string of the first preferred embodiment is fitted in an endless raceway having a small radius of curvature;

DETAILED DESCRIPTION OF THE PREFERRED EMBODIMENTS

Rolling element strings according to the invention will now be described in detail with reference to the accompanying drawings.

Figure 1:
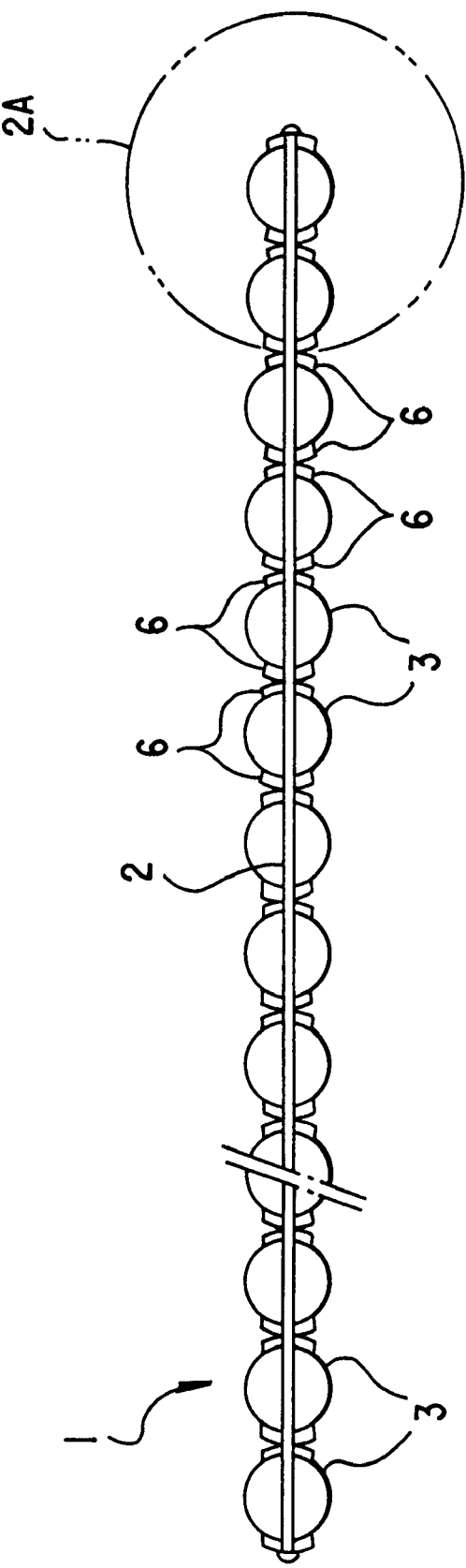
FIG. 1 is a front view of a ball string pertaining to a first preferred embodiment of the invention.

FIG. 1 shows a first preferred embodiment of a rolling element string according to the invention, and this rolling element string is constructed as a ball string in which balls are used as the rolling elements. This ball string 1 has multiple balls 3 arranged in a line with a predetermined spacing in a flexible link belt 2 made of resin, and the balls 3 are freely rotatably held in the link belt 2.

Figure 2A:
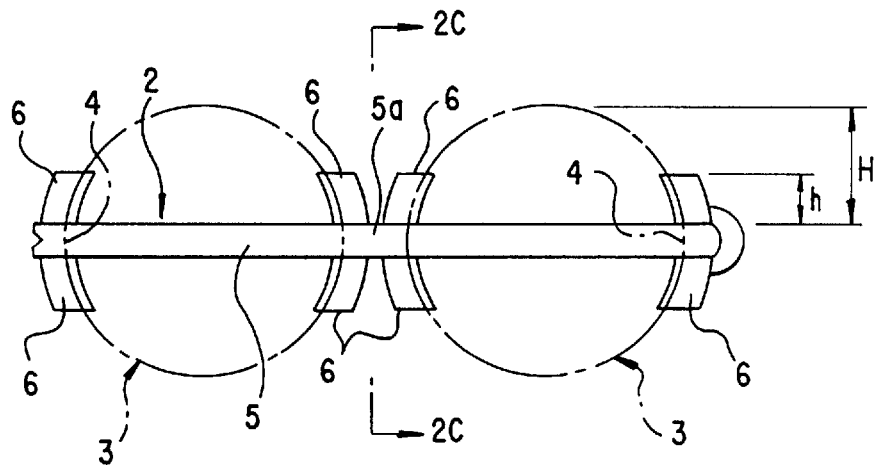
FIGS. 2A to 2C are enlarged views of a part 2A of the ball string shown in FIG. 1, FIG. 2A being a front view, FIG. 2B a plan view and FIG. 2C a section on the line 2C—2C, shown in FIG. 2A.
Figure 2B:
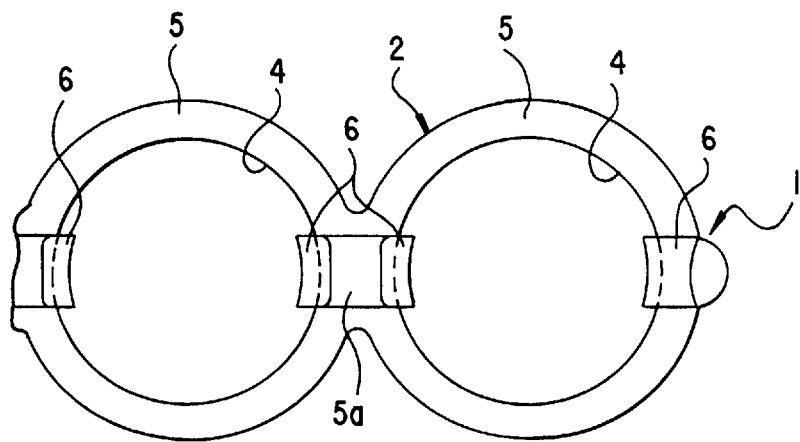
Figure 2C:
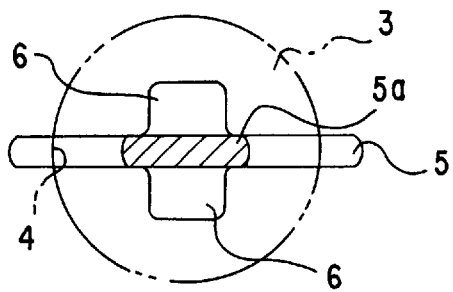

The link belt 2, as shown enlarged in FIGS. 2A and 2B, is constructed by connecting together in a line substantially ringlike links 5 in which are formed receiving holes 4 for the balls 3, and by one of the balls 3 being received in each of the links 5 the balls 3 are arranged with a predetermined spacing in the length direction of the link belt 2. A part of the periphery of each of the links 5 is connected to the adjacent link 5 by way of a connecting part 5a, and the link belt 2 forms a shape most waisted between mutually adjacent links 5, 5, i.e. at the connecting parts 5a. This link belt 2 can be curved or twisted pliably at the connecting parts 5a. FIG. 2C is a sectional view on the line 2C—2C in FIG. 2A.

A pair of holding parts 6, 6 is provided projecting from each of the upper and lower sides of each of the links at the front and rear ends thereof in the alignment direction of the balls 3, and by these holding parts 6 each of the balls 3 is prevented from falling out of the receiving hole 4 of the respective link 5. As shown in FIG. 2A, the projecting height h of the holding parts 6 with respect to the links 5 is set smaller than the projecting height H of the balls 3, and in this way, when the balls 3 are rolling along a ball rolling groove (a rolling element rollway) of a track rail or the like, the holding parts 6 are prevented from interfering with the ball rolling groove. Therefore, this ball string 1 can be used with a ball rolling groove whose sectional shape is a circular arc and can be used with a ball rolling groove whose sectional shape is a gothic arch.

This ball string 1 is manufactured by the link belt 2 being molded by injection molding of a synthetic resin with the balls 3 disposed inside the mold as cores and the balls 3 being removed from the mold together with the link belt 2 on the completion of molding. Because after the link belt 2 is injection molded the links 5 and the holding parts 6 constituting the link belt 2 are adhered to the balls 3 and the balls 3 cannot rotate freely with respect to the link belt 2, in this preferred embodiment the ball string 1 is immersed in a petroleum lubricant after the molding is completed until swelling with time of the link belt 2 forms gaps between the balls 3 and the links 5 and the holding parts 6, and free rotation of the balls 3 is thereby made possible.

Figure 3:
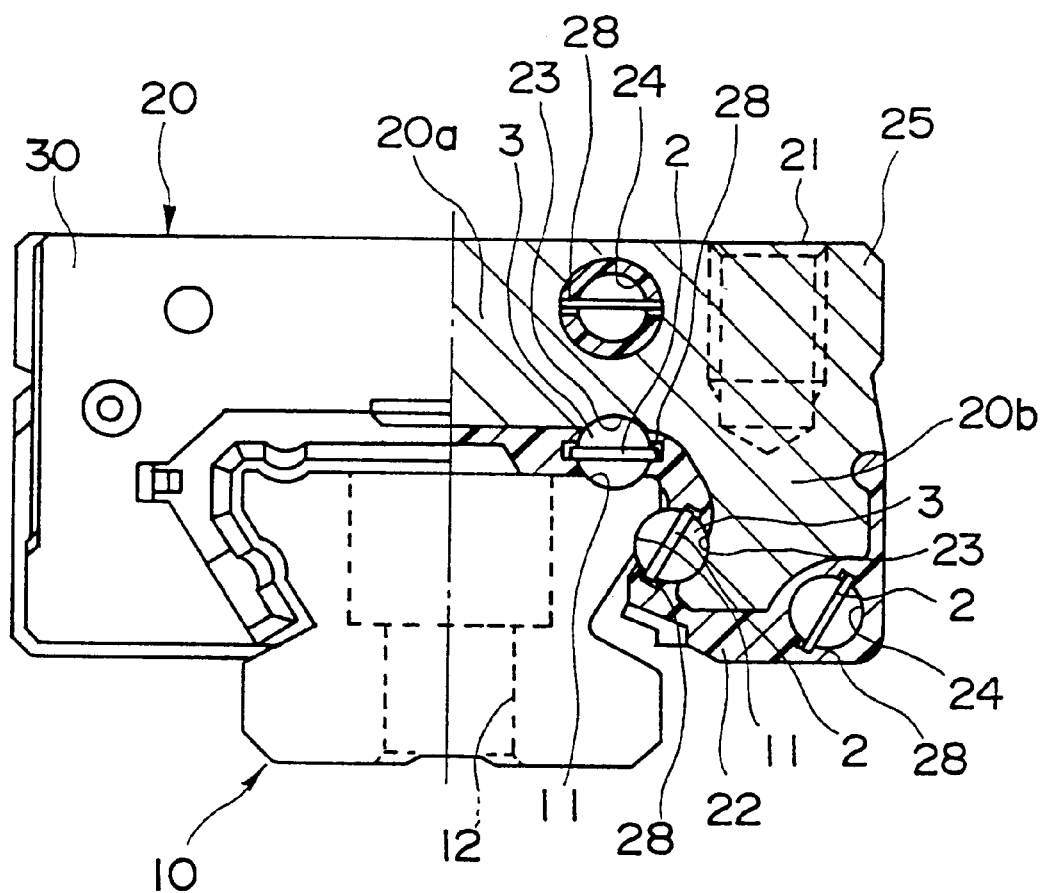
FIG. 3 is a partially sectional front view of a linear guide device in which a ball string of the first preferred embodiment can be used fitted in an endless ball raceway.
Figure 4:
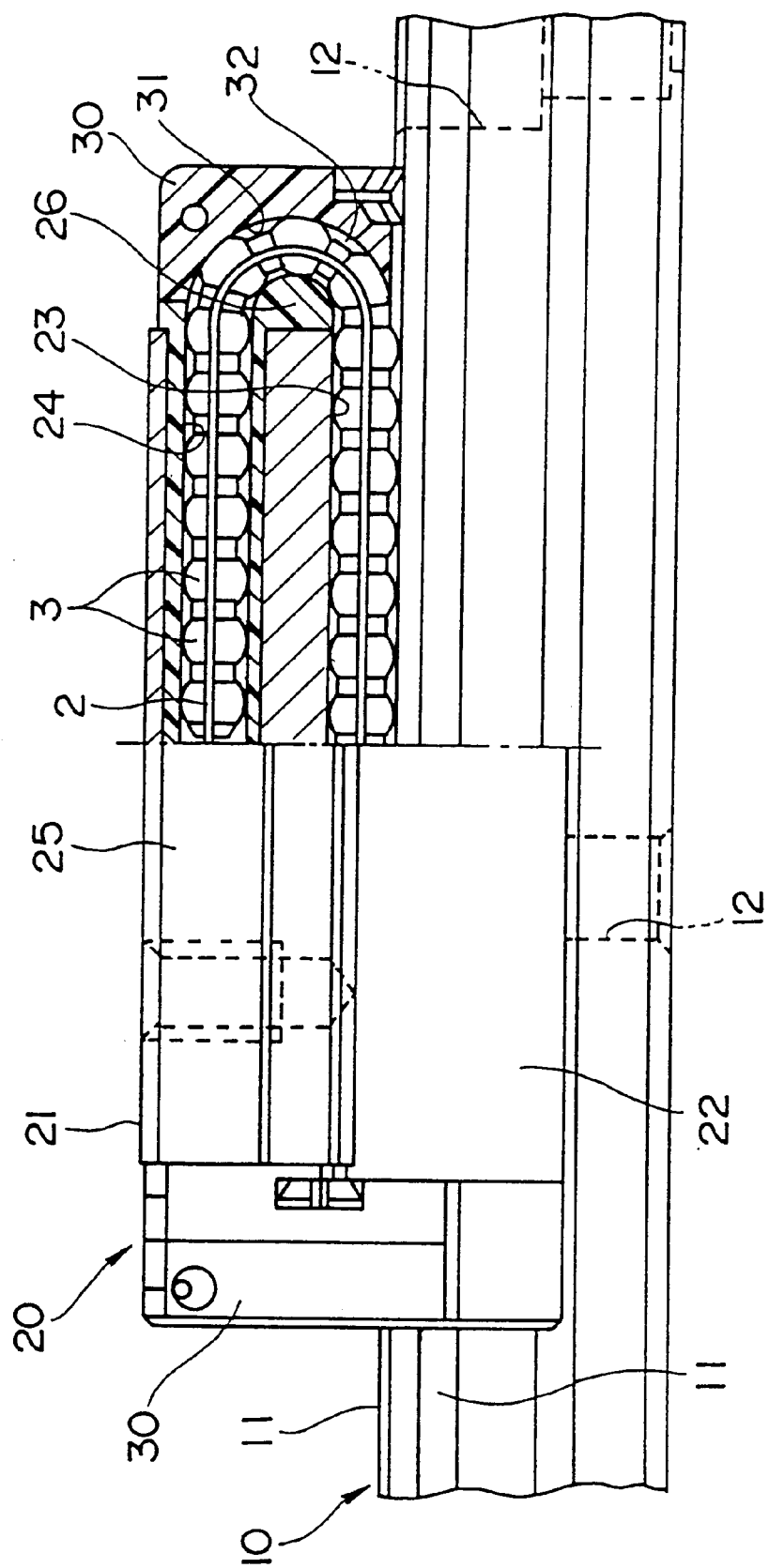
FIG. 4 is partially sectional side view of the linear guide device shown in FIG. 3.

FIG. 3 and FIG. 4 show an example of a linear guide device fitted with this ball string 1.

In these figures, the reference numeral 10 denotes a track rail (guide shaft) mounted on a stationary part such as a bed of a machine tool; the reference numeral 20 denotes a slider (slide member) which has an endless ball raceway in which the ball string (rolling element string) 1 described above is fitted and which guides a movable body such as a table; and the reference numeral 3 denotes balls (rolling elements) which roll while bearing a load between the track rail 10 and the slider 20 and endlessly circulate around the inside of the slider 20.

First, the track rail 10 is substantially rectangular in cross-section, and four arcuate ball rolling grooves (rolling element rollways) 11 are formed extending in its length direction (the direction perpendicular to the paper of FIG. 3) on its upper face and its side faces. Bolt mounting holes 12 are formed in the track rail 10 with a suitable spacing in the length direction thereof, and the track rail 10 is fixed to the stationary part by fixing bolts (not shown) inserted into these bolt mounting holes 12.

The slider 20 has a flat part 20a on which a mounting face 21 for the movable body is formed and a pair of skirt parts 20b, 20b descending from this flat part 20a and is roughly saddle-shaped in section, and arcuate loaded-rolling grooves (load rollways) 23 facing the ball rolling grooves 11 of the track rail 10 are formed on the underside of the flat part 20a and the inner faces of the skirt parts 20b, 20b. Ball return passages 24 corresponding to the loaded-rolling grooves 23 are formed in the flat part 20a and the skirt parts 20b, and balls 3 having finished rolling along the loaded-rolling grooves 23 and been freed from load roll through these ball return passages 24 in the opposite direction to their rolling direction on the loaded-rolling grooves 23.

This slider 20 is made using injection molding of a synthetic resin. That is, as shown in FIG. 3 and FIG. 4, the slider 20 is formed by cladding a resin part 22 by injection molding onto a metal main block 25 formed by machining, and while parts where mechanical strength is required such as the movable body mounting face 21 and the loaded-rolling grooves 23 are constituted by the main block 25, parts such as the ball return passages 24 where mechanical strength is not so important are made of synthetic resin to make the slider 20 as light as possible.

Also, as shown in FIG. 4, the endless ball raceways provided in the slider 20 are completed by synthetic resin cover members 30 being fixed to the front and rear end faces of the slider 20. That is, when the cover members 30 are fixed to the slider 20, ball guide parts 26 on the slider 20 side fit inside U-shaped grooves 31 on the cover member 30 side and U-shaped direction-reversing passages 32 are thereby completed, and the loaded-rolling grooves 23 and the ball return passages 24 of the slider 20 are connected by these direction-reversing passages 32.

As a result, in each of the endless ball raceways of the slider 20, when balls 3 having born a load between the loaded-rolling groove 23 of the slider 20 and the ball rolling groove 11 of the track rail 10 finish rolling along the loaded-rolling groove 23 along with the movement of the slider 20, they are freed from this load and enter the direction-reversing passage 32 of the cover member 30 and then still in a non-loaded state roll through the ball return passage 24 of the slider 20 in the opposite direction to the direction in which they roll through the loaded-rolling groove 23. Balls 3 having finished rolling through the ball return passage 24 pass through the direction-reversing passage 32 of the other cover member 30 and again enter between the track rail 10 and the slider 20 and roll along the loaded-rolling groove 23 while bearing a load.

The ball string 1 shown in FIG. 1 is used fitted in an endless raceway of a linear guide device constructed in this way and circulates around the endless raceway along with movement of the slider 20 with respect to the track rail 10. At this time, if the ball string 1 twists as it circulates around the endless raceway, smooth circulation of the balls 3 is hindered and noise results; for this reason, as shown in FIG. 3, two guide grooves 28 are formed in each of the endless raceways extending all the way around the raceway, and parts of the link belt 2 of the ball string 1 fitted in the endless raceway are loosely fitted in the guide grooves 28. As a result, the ball string 1 is guided by the guide grooves 28 all the way around the endless raceway and circulates in a predetermined attitude without twisting.

Figure 5:
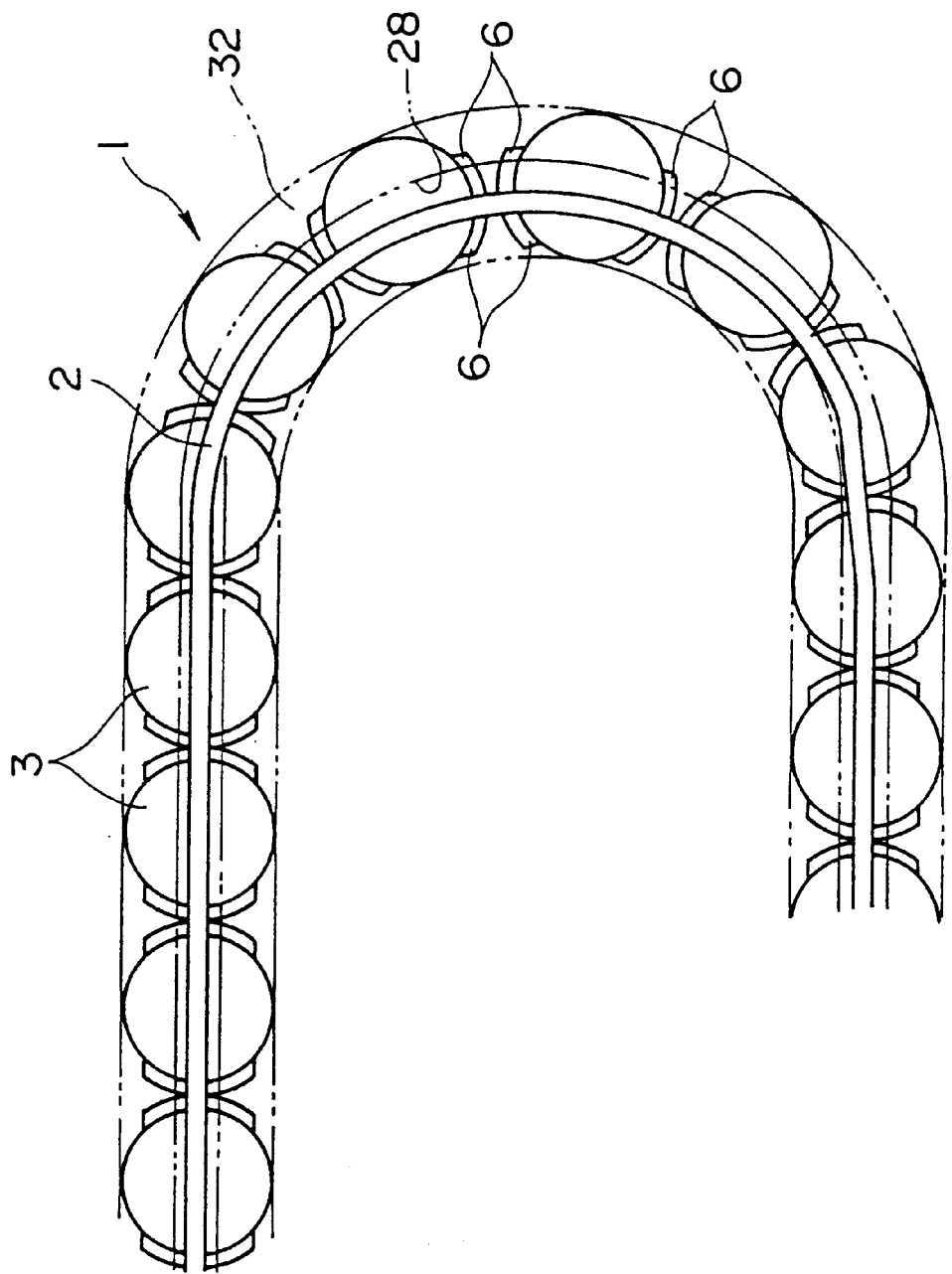
FIG. 5 is a partial enlarged view of a ball string of the first preferred embodiment fitted in an endless raceway of a linear guide device.

FIG. 5 shows a ball string 1 circulating around the inside of an endless raceway of the slider 20. As shown in this figure, the ball string 1 curves in a U-shape as it circulates around the inside of the direction-reversing passage 32 of the cover member 30, but because the ball string 1 is provided with pairs of holding parts 6, 6 for each of the balls 3 as described above, even when the link belt 2 connecting together the balls 3 curves inside the direction-reversing passage 32, the pairs of holding parts 6, 6 projecting on the outer side of the curved link belt 2 do not part widely and each of the balls 3 is surely held in the link belt 2.

Figure 15:
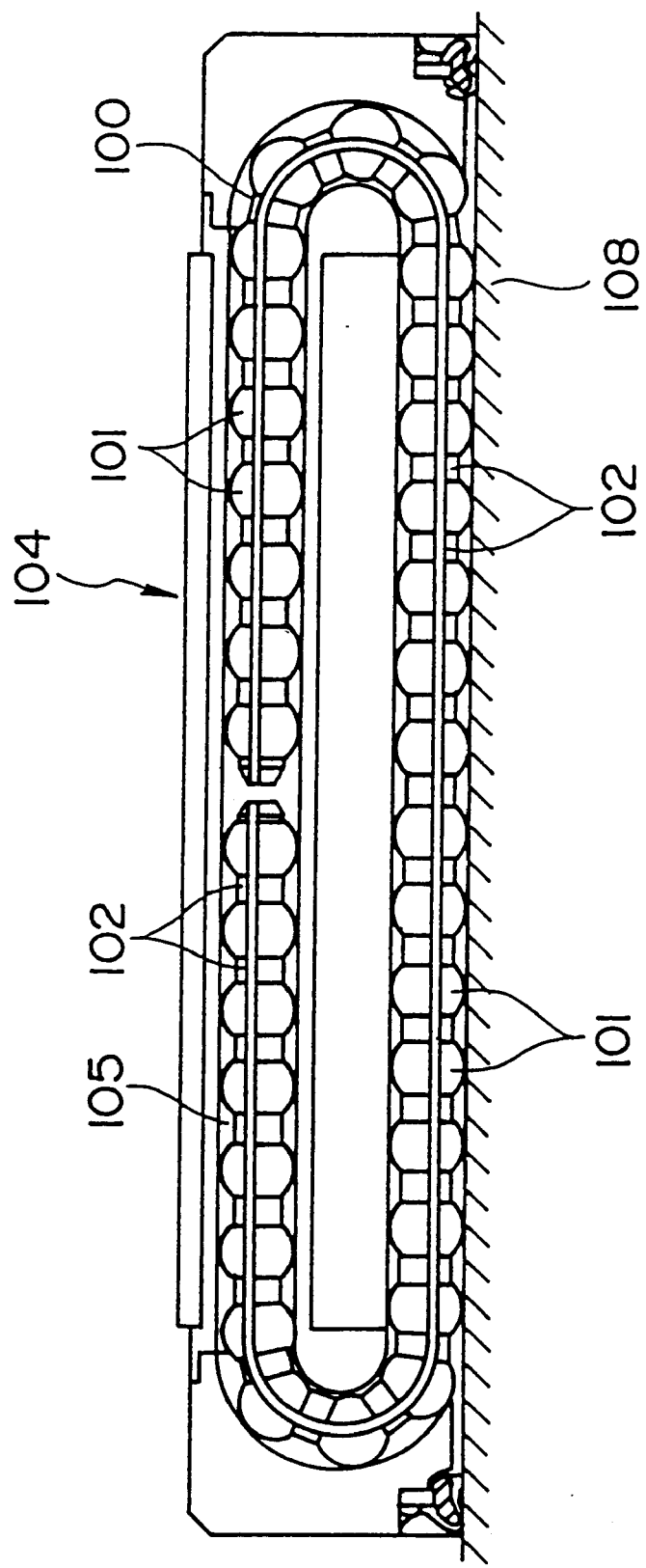
FIG. 15 is a sectional view showing the ball string shown in FIG. 12 fitted in an endless ball raceway of a linear guide device.
Figure 16:
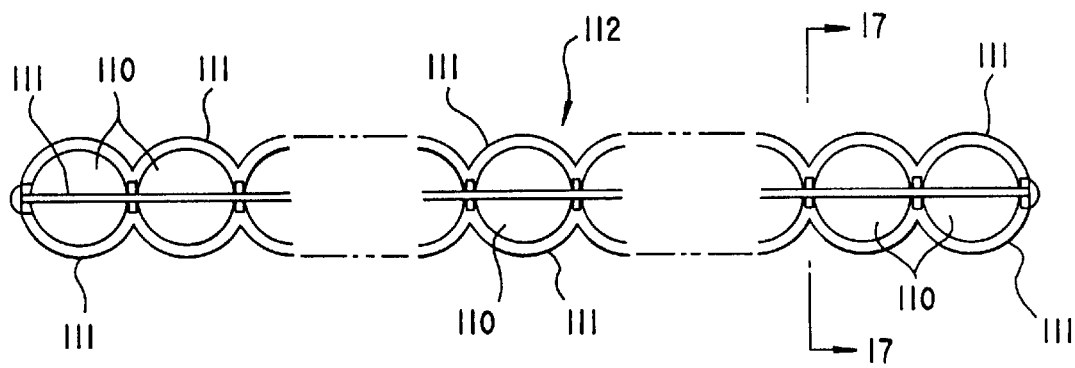
FIG. 16 is a front view showing a related art ball string previously proposed by the present inventors.
Figure 17:
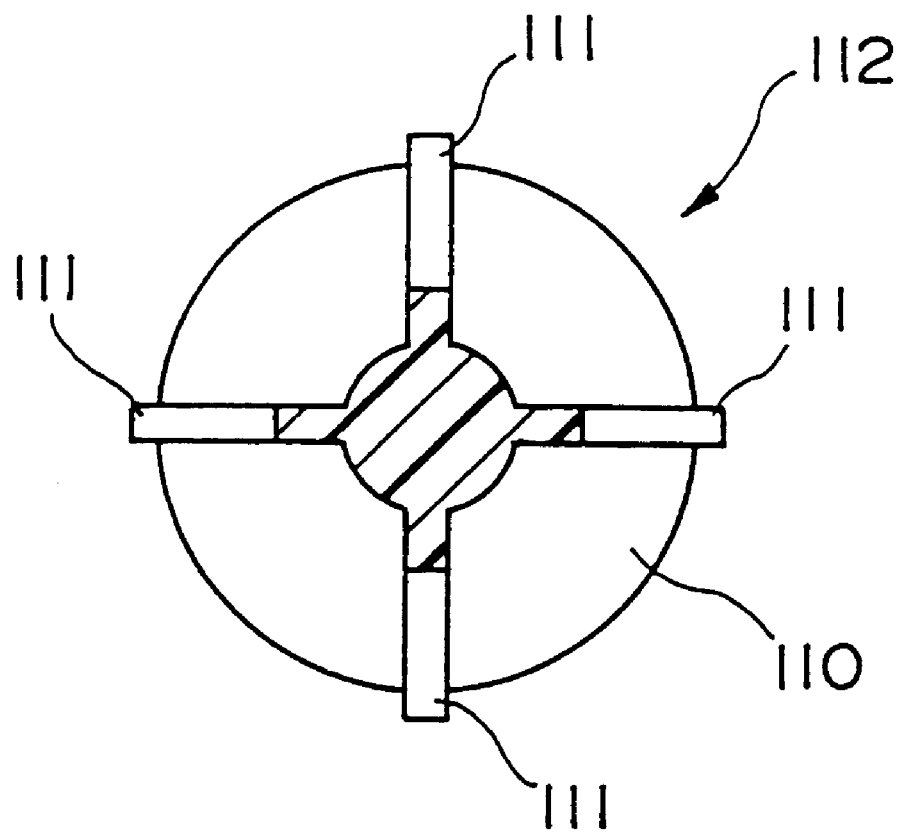
FIG. 17 is a sectional view on the line 17—17 of the ball string shown in FIG. 16.

And, because the projecting height h of the holding parts 6 provided on the link belt 2 is smaller than the projecting height H of the balls 3 (see FIG. 2), even when the link belt 2 is curved in a U-shape, the holding parts 6, 6 facing each other across the balls 3 on the inner side of the curved link belt 2 do not interfere with each other and the ball string 1 can be made to curve more pliably than the related art ball string 112 shown in FIG. 15.

Figure 6:
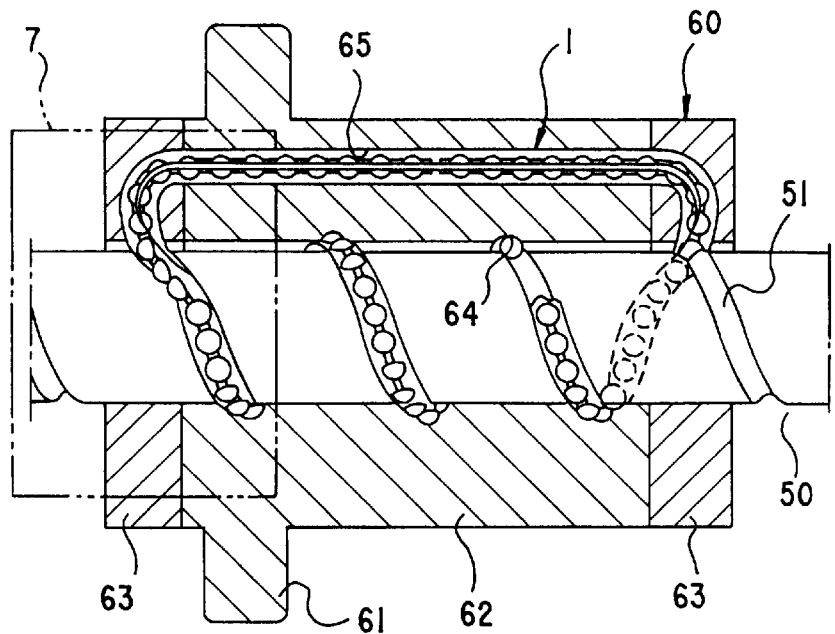
FIG. 6 is a sectional view of a ball screw device in which a ball string of the first preferred embodiment can be used fitted in an endless raceway.

FIG. 6 shows an example of a ball screw device (rolling element screw device) fitted with a ball string of the first preferred embodiment. In the figure, the reference numeral 50 denotes a screw shaft formed with a helical ball rolling groove (rolling element rollway) 51 with a predetermined lead, and the reference numeral 60 denotes a nut member having an endless raceway in which is fitted a ball string 1 and screwed onto the screw shaft 50 with the balls (rolling elements) 3 therebetween.

Here, the nut member 60 is made up of a steel nut body 62 provided with a projecting flange part 61 for holding the nut member 60 and a pair of synthetic resin cover members 63, 63 fixed to front and rear end faces of this nut body 62.

Figure 7:
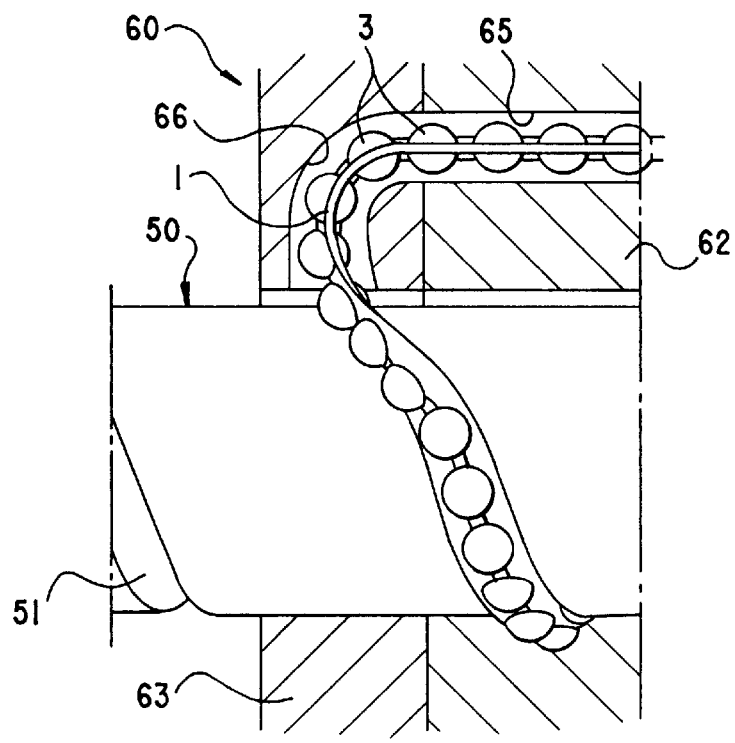
FIG. 7 is a partial enlarged view of a part 7 of the ball screw device shown in FIG. 6.

The nut body 62 has a helical loaded-rolling groove (load rollway) 64 facing the ball rolling groove 51 of the screw shaft 50 formed on its inner circumferential surface, and has a ball return passage 65 parallel with the screw shaft 50 bored through it. A direction-reversing passage 66 for guiding balls 3 having finished rolling along the loaded-rolling groove 64 of the nut body 62 into the ball return passage 65 is formed in the cover member 63, as shown in FIG. 7, a direction-reversing passage is also formed in the other cover member 63, and by the cover members 63 being fixed to the nut body 62 an endless raceway for the balls 3 is completed. The ball rolling groove 51 of the screw shaft 50 and the loaded-rolling groove 64 of the nut body 62 are formed in the shape of a gothic arch.

Also, in the direction-reversing passages 66 of the cover members 63 and the ball return passage 65 of the nut body 62, as in the linear guide device described above, two guide grooves for guiding the link belt 2 of the ball string 1 are formed along the passages, and the ball string 1 having passed around the outside of the screw shaft 50 is received in the direction-reversing passage 66 of the respective cover member 63 in a predetermined attitude.

In a ball screw device of this preferred embodiment constructed as described above, when the screw shaft 50 and the nut member 60 rotate relative to each other, the balls 3 of the ball string 1 roll along the loaded-rolling groove 64 of the nut member 60 and the ball rolling groove 51 of the screw shaft 50 and the ball string 1 circulates around the inside of the endless raceway formed by the nut member 60.

At this time, in the ball screw device of this preferred embodiment, because the ball string 1 is wound in a helix around the outside of the screw shaft 50, the ball string 1 circulates around the endless raceway in a twisted state. In particular, when the ball string 1 enters the direction-reversing passage 66 of the respective cover member 63 from the outside of the screw shaft 50, as shown in FIG. 7, it is necessary for the ball string 1 to be forcibly twisted through about 90° as it enters the direction-reversing passage 66, and the bending and twisting of the ball string 1 inside the endless raceway are inevitably more severe than in circulation in the linear guide device described above.

However, because the ball string 1 of this preferred embodiment has a structure such that the link belt 2 is easy to bend and easy to twist pliably, it can circulate around the endless raceway of the nut member 60 freely and the circulation of the ball string 1 inside the endless raceway can be made smooth.

Also, even if the ball string 1 is bent and twisted frequently, because in the ball string 1 of this preferred embodiment the balls 3 are each held individually in the link belt 2 by pairs of holding parts, the balls 3 do not fall out from the link belt 2 and incidents of balls 3 dropping out of the endless raceway can be prevented.

Next, a second preferred embodiment of a rolling element string according to the invention shown in FIG. 8 will be described.

In the first preferred embodiment described above the holding parts 6 projecting from the upper and lower sides of each of the links 5 were all the same projecting height h (see FIG. 2), but when this is the case, when the radius of curvature R to which the ball string 1 is curved into a U-shape is extremely small, as shown in FIG. 11, there is a risk of balls 3 falling out of the link belt 2 due to the holding parts 6, 6 projecting on the outer side of the curved link belt 2 parting widely.

To overcome this, in this second preferred embodiment, the projecting height of holding parts 6a provided on one side of the link belt 2 is made higher than that of holding parts 6b provided on the other side, and when this ball string 1 is curved the balls 3 are thereby prevented from falling out of the link belt 2 toward the outer side of the curve.

Figure 9A:
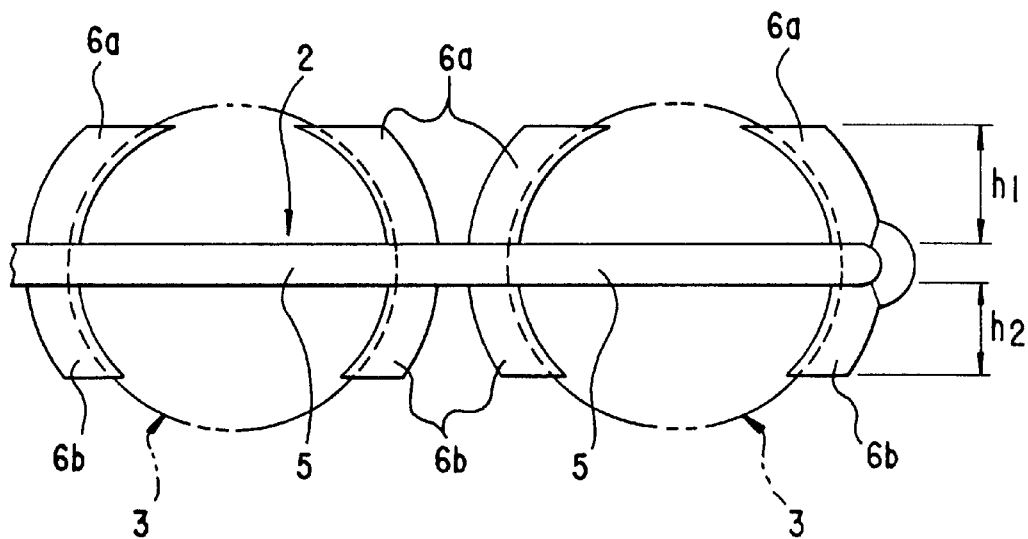
FIG. 9A is an enlarged front view and FIG. 9B an enlarged plan view of part 9A of the ball string shown in FIG. 8.
Figure 9B:
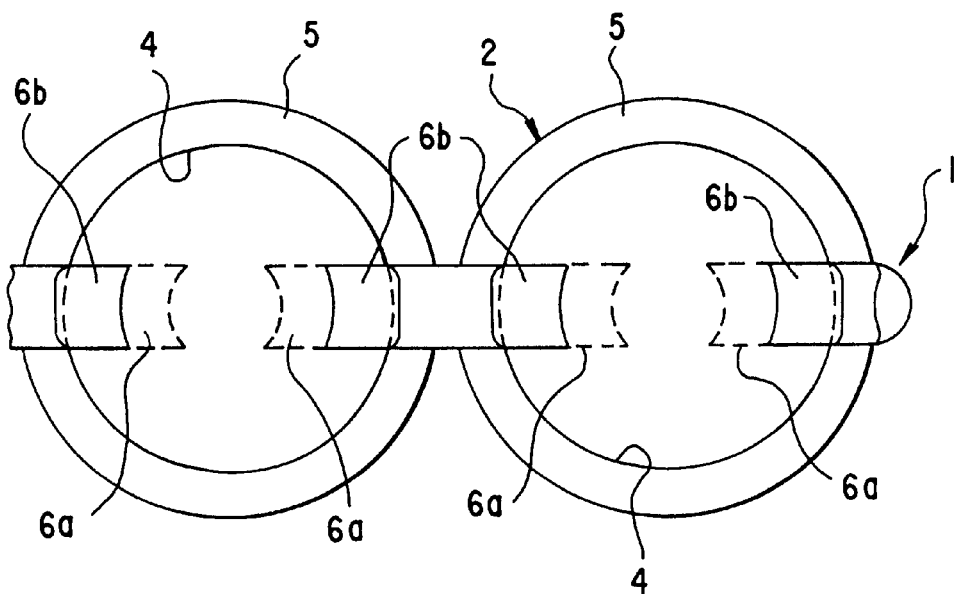

Specifically, as shown in FIG. 9 and FIG. 10, the holding parts 6a, 6b are formed so that when the projecting height of the holding parts 6a provided on a first side of the link belt 2 is written $h_1$ and the projecting height of the holding parts 6b provided on the other side is written $h_2$, then $h_1 > h_2$. The construction of the ball string of this preferred embodiment than the holding parts 6a, 6b is exactly the same as that of the first preferred embodiment described above, and accordingly the same reference numerals as in the first preferred embodiment have been used in the figures and a detailed description will not be given here.

A ball string of this preferred embodiment constructed in this way is so fitted inside an endless raceway of the linear guide device described above that the holding parts 6a are positioned on the outer sides of the curves, and circulates around the endless raceway along with movement of the slider 20 with respect to the track rail 10.

At this time, because in the ball string 1 the projecting height $h_1$ of the holding parts 6a positioned on the outer side of the endless raceway has been made higher than the projecting height $h_2$ of the holding parts 6b positioned on the inner side, even when the radius of curvature R of when the ball string 1 curves in a U-shape is extremely small, the holding parts 6a, 6a facing each other across the balls 3 do not part widely and the balls 3 are effectively prevented from falling out from between these holding parts 6a, 6a to the outer side of the curve.

Also, even while the balls 3 are prevented from falling out in this way, because the projecting height $h_2$ of the holding parts 6b positioned on the inner side of the endless raceway is lower than the projecting height $h_1$ of the holding parts 6a, these holding parts do not interfere with the inner sides of the direction-reversing passages 32 and the ball string 1 can circulate smoothly inside the endless raceway.

Figure 12:
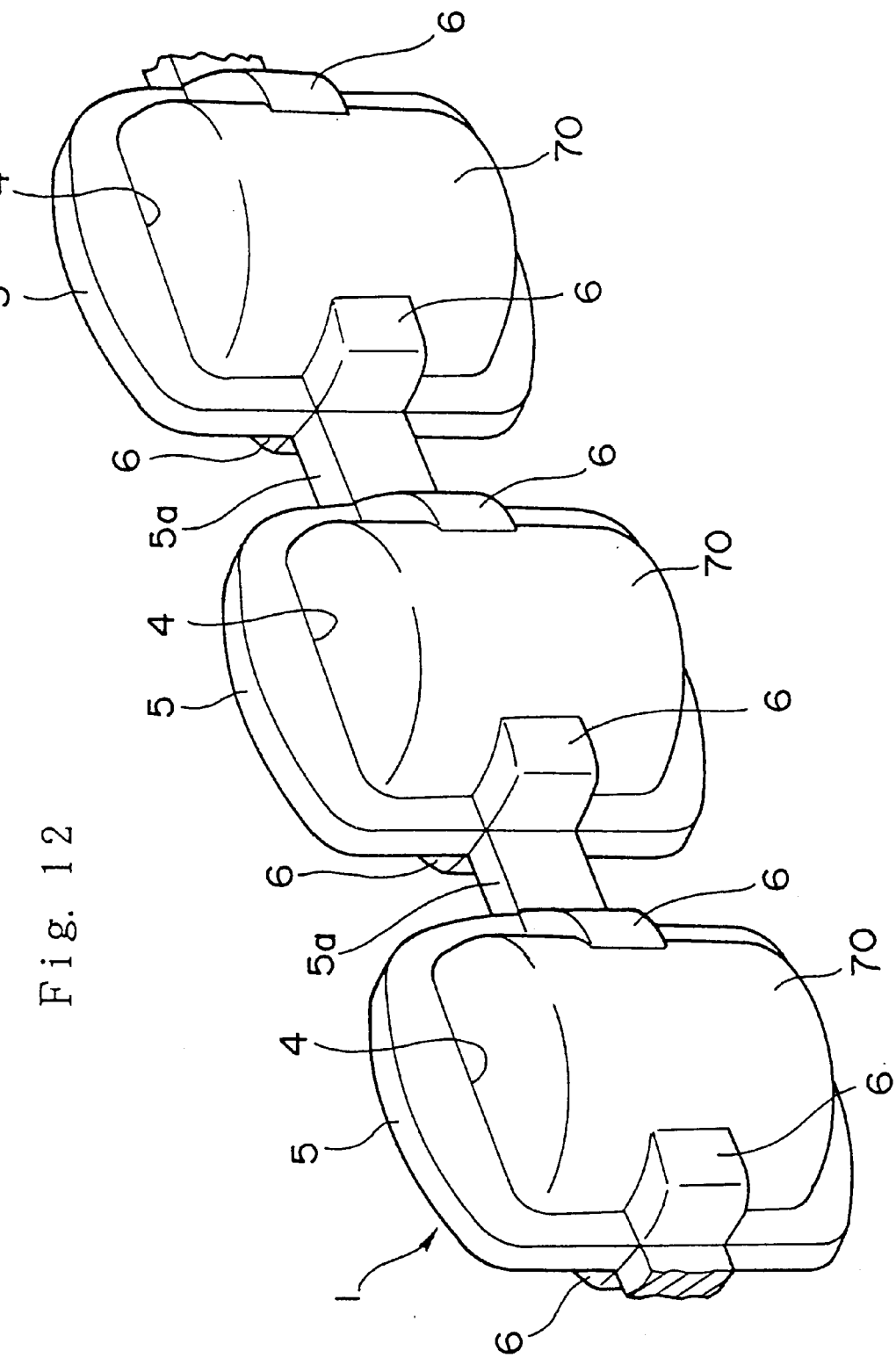
FIG. 12 is a perspective view of a roller string pertaining to a third preferred embodiment of the invention.
Figure 13:
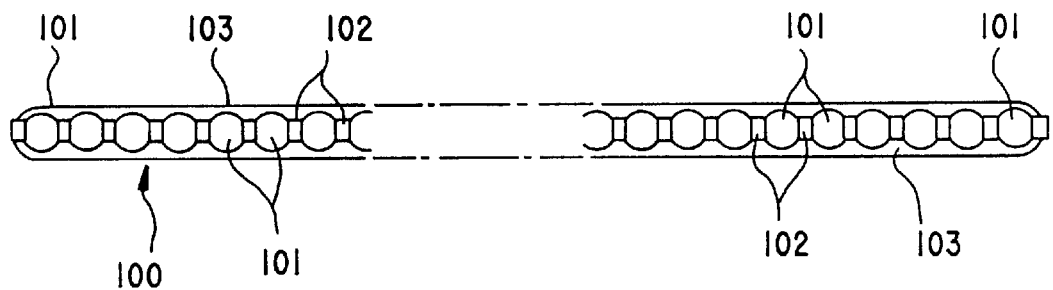
FIG. 13 is a plan view of a ball string of related art.
Figure 14:
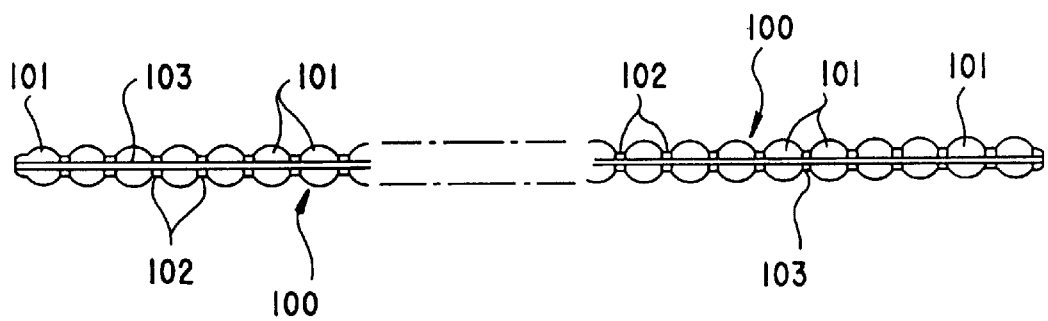
FIG. 14 is a front view of a ball string of related art.

FIG. 12 shows a third preferred embodiment of a rolling element string according to the invention.

In the first and second preferred embodiments described above balls 3 were used, but in this third preferred embodiment rollers 70 are used as the rolling elements. In this case, the rollers 70 are received in the links 5 so that their direction of rolling is the same as the length direction of the link belt 2, and the holding parts 6 are provided projecting from the links 5 so as to hold the cylindrical faces of the rollers 70. The rest of the specific construction and the projecting heights of the holding parts 6 and the manufacturing method and so on are substantially the same as in the preferred embodiments described above, and accordingly the same reference numerals have been used in the figures and a detailed description will be omitted.

What is claimed is:

1. A rolling element string comprising multiple rolling elements for rolling along a rolling element rollway of a bearing device and a flexible link belt by which these rolling elements are arranged in a line with a predetermined spacing and each rolling element rollably held, the link belt comprising:

multiple links connected in a line and each link being formed substantially like a ring and having a receiving hole for a rolling element; and holding parts provided for each link projecting from upper and lower sides of each of the links at front and rear ends thereof in the rolling element aligned direction for preventing the rolling element from falling out of the receiving hole.

2. A rolling element string according to claim 1, wherein except for regions making contact with the rolling element rollway the surfaces of the rolling elements arranged in the link belt are covered by the holding parts.

3. A rolling element string according to claim 1, wherein the projecting height with respect to the links of the holding parts projecting from one of the upper and lower sides of the links is higher than that of the other holding parts projecting from the other side of the links.

4. A rolling element string according to claim 3, wherein the holding parts having the larger projecting height are arranged on the side of the links of the rolling element string adapted to be disposed closest to a portion of the rolling element rollway having the greater radius of curvature.

5. A rolling element string according to claim 1, wherein the rolling elements are cylindrical rollers.

6. A linear guide device comprising a guide shaft having a rolling element rollway extending in its length direction and a slide member which moves along the guide shaft and has a load rollway facing this rolling element rollway and has a no-load rollway through which rolling elements are circulated from one end of the load rollway to the other, wherein a rolling element string according to any one of claims 1 to 3, 4 or 5 is fitted in an endless raceway formed by the load rollway and the no-load rollway of the slide member and the rolling elements bear a load between the load rollway of the slide member and the rolling element rollway of the guide shaft.

7. A rolling element screw device comprising a screw shaft in an outer circumferential surface of which is formed a helical rolling element rollway and a nut member which screws along the screw shaft on rolling elements and has in an inner circumferential surface thereof a load rollway facing the rolling element rollway of the screw shaft and has a no-load rollway through which the rolling elements are circulated from one end of the load rollway to the other, wherein a rolling element string according to any one of claims 1 to 3, 4 or 5 is fitted in an endless raceway formed by the load rollway and the no-load rollway of the nut member and the rolling elements of the rolling element string bear a load between the load rollway of the nut member and the rolling element rollway of the screw shaft.

* * * * *